United States Patent
Gore et al.

(10) Patent No.: US 10,613,847 B2
(45) Date of Patent: Apr. 7, 2020

(54) INFORMATION HANDLING SYSTEM TO TREAT DEMOTED FIRMWARE WITH REPLACEMENT FIRMWARE

(71) Applicant: DELL PRODUCTS, LP, Round Rock, TX (US)

(72) Inventors: Santosh Hanamant Gore, Bangalore (IN); Sujit Dagadu Jadhav, Bangalore (IN); Raveendra Babu Madala, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/895,623

(22) Filed: Feb. 13, 2018

(65) Prior Publication Data

US 2019/0250897 A1    Aug. 15, 2019

(51) Int. Cl.
*G06F 8/61* (2018.01)
*H04L 29/08* (2006.01)
*G06F 8/71* (2018.01)
*G06F 8/65* (2018.01)

(52) U.S. Cl.
CPC .............. *G06F 8/62* (2013.01); *G06F 8/65* (2013.01); *G06F 8/71* (2013.01); *H04L 29/08981* (2013.01)

(58) Field of Classification Search
CPC ......... G06F 8/62; G06F 8/71; H04L 29/08981
See application file for complete search history.

(56) References Cited

U.S. PATENT DOCUMENTS

| | | | |
|---|---|---|---|
| 6,584,559 B1* | 6/2003 | Huh | G06F 8/60 713/1 |
| 8,707,297 B2 | 4/2014 | Brown et al. | |
| 2005/0188170 A1* | 8/2005 | Yamamoto | G06F 8/65 711/170 |
| 2005/0223373 A1 | 10/2005 | Gage et al. | |
| 2008/0243862 A1* | 10/2008 | Pathak | G06F 8/60 |
| 2011/0083129 A1* | 4/2011 | Masaki | G06F 8/65 717/175 |
| 2012/0159468 A1* | 6/2012 | Joshi | G06F 8/61 717/172 |
| 2015/0089209 A1* | 3/2015 | Jacobs | G06F 21/575 713/1 |

* cited by examiner

*Primary Examiner* — Wei Y Zhen
*Assistant Examiner* — Amir Soltanzadeh
(74) *Attorney, Agent, or Firm* — Larson Newman, LLP

(57) ABSTRACT

An information handling system includes product lifecycle management circuitry and a management controller. The product lifecycle management circuitry receives an indication that a first firmware update package is to be demoted, starts a demotion process for the first firmware update package, and removes the first firmware update package from being available on an Internet website. The management controller extracts a first identifier for the first firmware update package, determines a first context in which the first firmware update package is being demoted, and publishes the first identifier and the first context in an exclusion catalog.

17 Claims, 6 Drawing Sheets

INFORMATION HANDLING SYSTEM TO TREAT DEMOTED FIRMWARE WITH REPLACEMENT FIRMWARE

FIELD OF THE DISCLOSURE

The present disclosure generally relates to information handling systems, and more particularly relates to an information handling system to treat demoted firmware with replacement firmware.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes product lifecycle management circuitry and a management controller. The product lifecycle management circuitry may receive an indication that a first firmware update package is to be demoted, may start a demotion process for the first firmware update package, and may remove the first firmware update package from being available on an Internet website. The management controller may extract a first identifier for the first firmware update package may determine a first context in which the first firmware update package is being demoted, and may publish the first identifier and the first context for the first firmware update package being demoted in an exclusion catalog.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
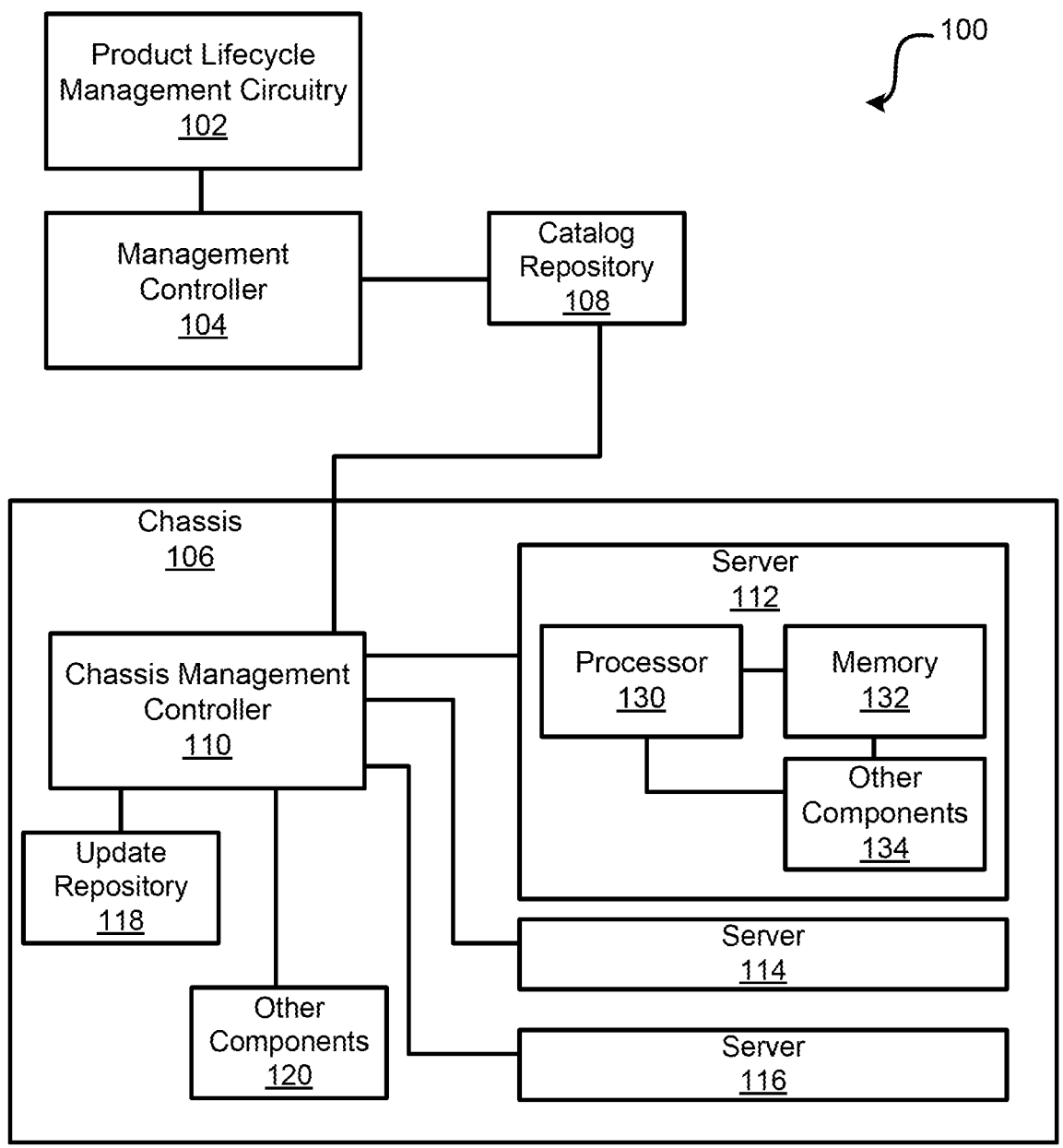
FIG. 1 is a block diagram of an information handling system according to at least one embodiment of the disclosure.

FIG. 1 shows a portion of an information handling system 100, such as a server chassis. For purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

The information handling system 100 includes product lifecycle management circuitry 102, management controller 104, a chassis 106, and a catalog repository 108. The chassis 106 includes a chassis management controller 110, servers 112, 114, and 116, an update repository 118, and other components 120. Each of the servers 112, 114, and 116 can include multiple components, such as a processor 130, a memory 132, and other components 134 of server 112 shown in FIG. 1. The product lifecycle management circuitry 102 communicates with the management controller 104, which in turn communicates with the catalog repository 108. The chassis management controller 110 communicates with the catalog repository 108, with the servers 112, 114, and 116, and with the update repository 118.

During operation, the product lifecycle management circuitry 102 can determine firmware updates for the servers 112, 114, and 116. The product lifecycle management circuitry 102 can initiate the firmware update be published to a website for access by the servers 112, 114, and 116 by providing an indication to the management controller 104, which in turn can publish the firmware update to the catalog repository 108. The chassis management controller 110 can then access the catalog repository 108 and download an update package for the firmware update. The chassis management controller 110 can then store the update package to the update repository 118 for later update in the servers 112, 114, and 116.

The product lifecycle management circuitry 102 can at a later point in time determine that one or more of the update packages within the catalog repository 108 should be demoted, such that the update packages are not utilized within one of the servers 112, 114, and 116. In an embodiment, the update packages may get demoted due to the firmware updates causing harm to the servers 112, 114, and 116 after the update is applied, a failure of the servers 112, 114, and 116 in applying update in certain contexts, or the like. In an embodiment, the harm to the servers 112, 114, and 116 could be bricking of the servers 112, 114, and 116, certain workloads not functioning as expected, some security issues on the servers 112, 114, and 116, or the like.

The management controller 104 can demote the update packages that are causing issues by removing the demoted update packages from a published location, such as an Internet webpage or the like. However, the catalogs, which contain metadata about the update packages, within the catalog repository 108 may not be aware of the demotion of the different update packages. However, currently there is no method for correcting already downloaded catalogs and preventing the user from applying the demoted update package downloaded prior to demotion. Additionally, the demoted update package might already be applied on one or more of the servers 112, 114, and 116, but the harm caused by this update might or might not be realized by the user. However, at present there is no mechanism to detect this kind of firmware which is currently executing on the servers 112, 114, and 116. Thus, the present disclosure provides an improvement in providing firmware updates by including a system and process to remove demoted firmware updates from a system, such as the chassis 106, before the demoted firmware update can cause a problem within the servers 112, 114, and 116.

Thus, the management controller 104 can generate an exclusion catalog with the demoted firmware located within the exclusion catalog to prevent the demoted firmware causing harm to one or more of the servers 112, 114, and 116. After the management controller 104 receives an indication that a firmware update package has been demoted by the product lifecycle management circuitry 102, the management controller 104 can retrieve details about the firmware update package. In an embodiment, the details can include an identifier for the update package, a context in which the update package is being demoted, and the like. In an embodiment, the identifier can be a globally unique identifier (GUID) located in an executable file, such as package.xml of the update package being demoted. The context for the demotion can be operating system, platform, context in terms of solution, or the like.

The management controller 104 can then generate the exclusion catalog with the demoted update package located within the exclusion catalog. In an embodiment, the details of the demoted update package listed above can be included in the exclusion catalog. The management controller 104 can then validate the exclusion catalog, and then publish the exclusion catalog if the exclusion passes the validation. In an embodiment, the exclusion catalog can be published within the catalog repository 108 for use by the chassis management controller 110.

The chassis management controller 110 can then utilize the exclusion catalog in a number of different scenarios, such as preventing a demoted firmware update from being applied to the servers 112, 114, and 116, fetching a replacement firmware update package during a firmware update package installation, reverting to a previous firmware package if an installed firmware update package has been demoted, or the like.

In an embodiment, the chassis management controller 110 can start a firmware update installation. In an embodiment, the chassis management controller can retrieve a firmware update store within the update repository 118. The chassis management controller 110 can then fetch an exclusion catalog from the catalog repository 108. The chassis management controller 110 can determine whether the firmware update package to be installed is excluded for a context in which the firmware update is to be utilized within the servers 112, 114, and 116. In an embodiment, the chassis management controller 110 can make this determination by comparing a version, identifier, firmware package hash, or the like of the firmware update package to be installed with the details of demoted firmware updates within the exclusion catalog.

If the firmware update is not located within the exclusion catalog or is not excluded for the specific context, the chassis management controller 110 can complete the installation of the firmware update. However, if the firmware update is located within the exclusion catalog and is excluded for the specific context, the chassis management controller 110 can perform different actions. In one embodiment, the management controller 110 can stop the installation and send an error message to a user of the chassis 106. In another embodiment, the chassis management controller 110 can determine a replacement update package by automatically accessing and scanning update catalogs within the catalog repository 108. The chassis management controller 110 can then download the replacement update package, and apply the downloaded update package to the servers 112, 114, and 116 during the completion of the installation process.

In a different situation, a demoted firmware update package may already be installed on the servers 112, 114, and 116. In this situation, the chassis management controller 110 can monitor the exclusion catalog within the catalog repository 108, and can determine whether the exclusion catalog is updated. Upon the exclusion catalog being updated, the chassis management controller 110 can fetch an inventory of updatable components within the chassis 106, such as the servers 112, 114, and 116, to determine currently installed firmware packages.

The chassis management controller 110 can then download a latest exclusion catalog, can compare the installed firmware package within the servers 112, 114, and 116 to the demoted firmware update packages located within the exclusion catalog. In an embodiment, the chassis management controller 110 can make this determination is made by comparing an installed updated version, identifier, firmware package hash, or the like of the installed firmware update with the details of demoted firmware updates within the exclusion catalog. If the installed firmware package is within the exclusion catalog, the chassis management controller 110 can rollback the firmware within the servers 112, 114, and 116 to a previous firmware. Therefore, the generating and publishing of the exclusion catalog by the management controller 104 can be utilized by the chassis management controller to prevent demote firmware update packages from harming the servers 112, 114, and 116.

Figure 2:
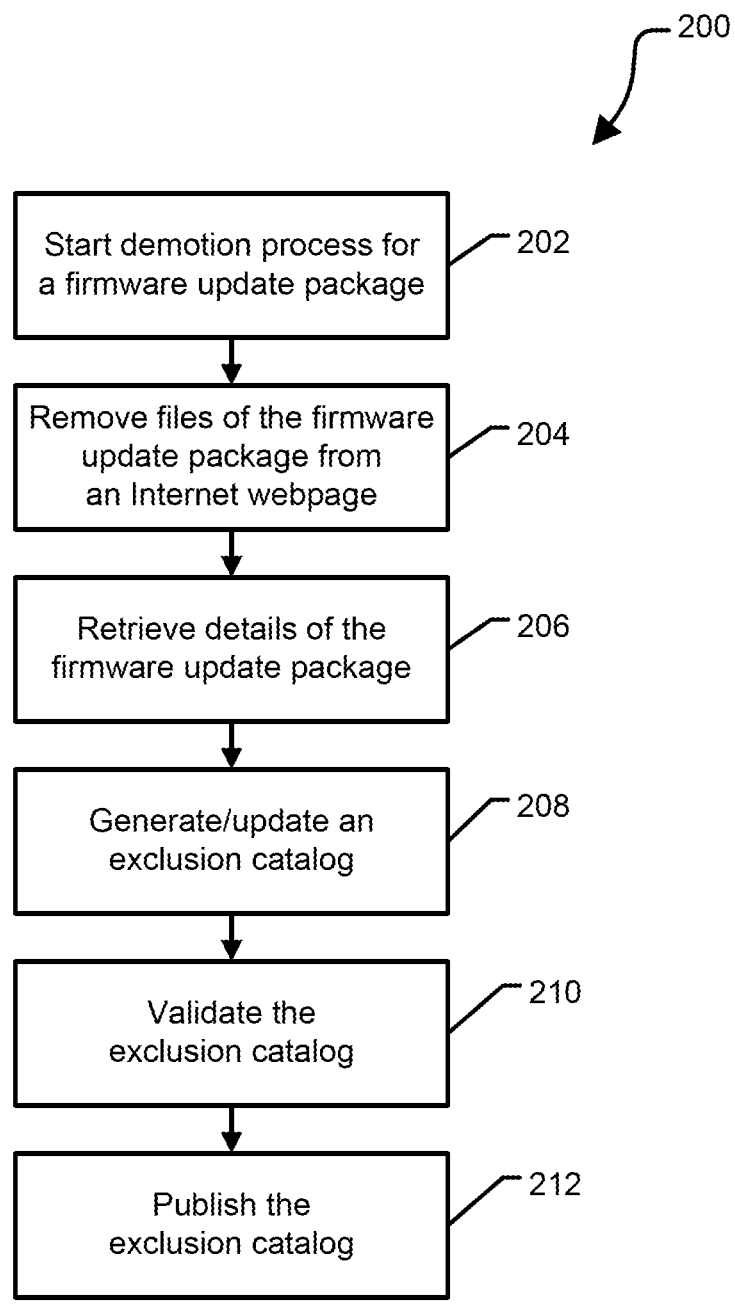
FIG. 2 is a flow diagram of a method for demoting a firmware update package according to at least one embodiment of the present disclosure.

FIG. 2 is a flow diagram of a method 200 for demoting a firmware update package according to at least one embodiment of the present disclosure. At block 202, a demotion process for a firmware update package is started. In an embodiment, product lifecycle management circuitry can start the demotion process. Files associated with the demoted firmware update package are removed from an Internet webpage at block 204. In an embodiment, the demotion process can be passed from the product lifecycle management circuitry to a management controller. At block 206, details of the firmware update package to be demoted are retrieved. In an embodiment, the details can include an identifier for the update package, a context in which the update package is being demoted, and the like. In an embodiment, the identifier can be a globally unique identifier (GUID) located in an executable file, such as package.xml of the update package being demoted. The context for the demotion can be operating system, platform, context in terms of solution, or the like.

At block 208, an exclusion catalog can be generated or updated with the demoted update package added or located within the exclusion catalog. In an embodiment, the details of the demoted update package listed above can also be included in the exclusion catalog. The exclusion catalog can be validated at block 210. In an embodiment, the management controller can validate the exclusion catalog by verifying the details about the demoted update packages within the exclusion catalog. At block 212, the exclusion catalog can be published to an Internet webpage. In an embodiment, the Internet webpage can be accessible by a chassis management controller as described in greater detail below.

Figure 3:
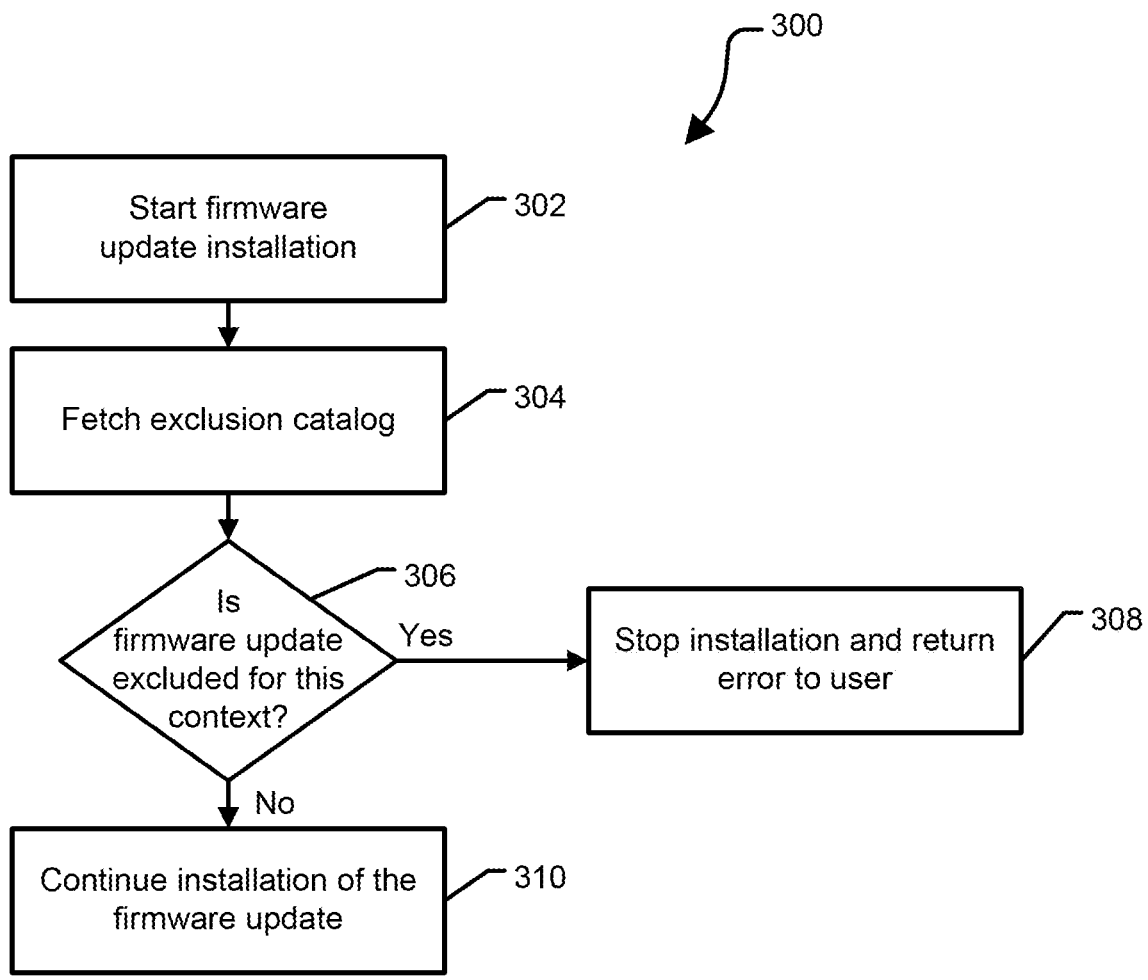
FIG. 3 is a flow diagram of a method for preventing a demoted firmware update from being applied according to at least one embodiment of the present disclosure.

FIG. 3 is a flow diagram of a method 300 for preventing a demoted firmware update from being applied according to at least one embodiment of the present disclosure. At block 302, a firmware update installation is started. In an embodiment, the firmware update installation can include a chassis management controller within a server chassis retrieving a firmware update from an update repository within the chassis. An exclusion catalog is fetched at block 304. In an embodiment, the exclusion catalog can be fetched from a catalog repository via an Internet webpage.

At block 306, a determination is made the firmware update is located within the exclusion catalog and is excluded for the context which the firmware update is to be utilized within a server of the chassis. If the firmware update is located within the exclusion catalog and is excluded for the specific context, then the installation is stopped and an error message is returned to a user at block 308. However, if the firmware update is not located within the exclusion catalog or is not excluded for the specific context, the installation of the firmware update is continued at block 310.

Figure 4:
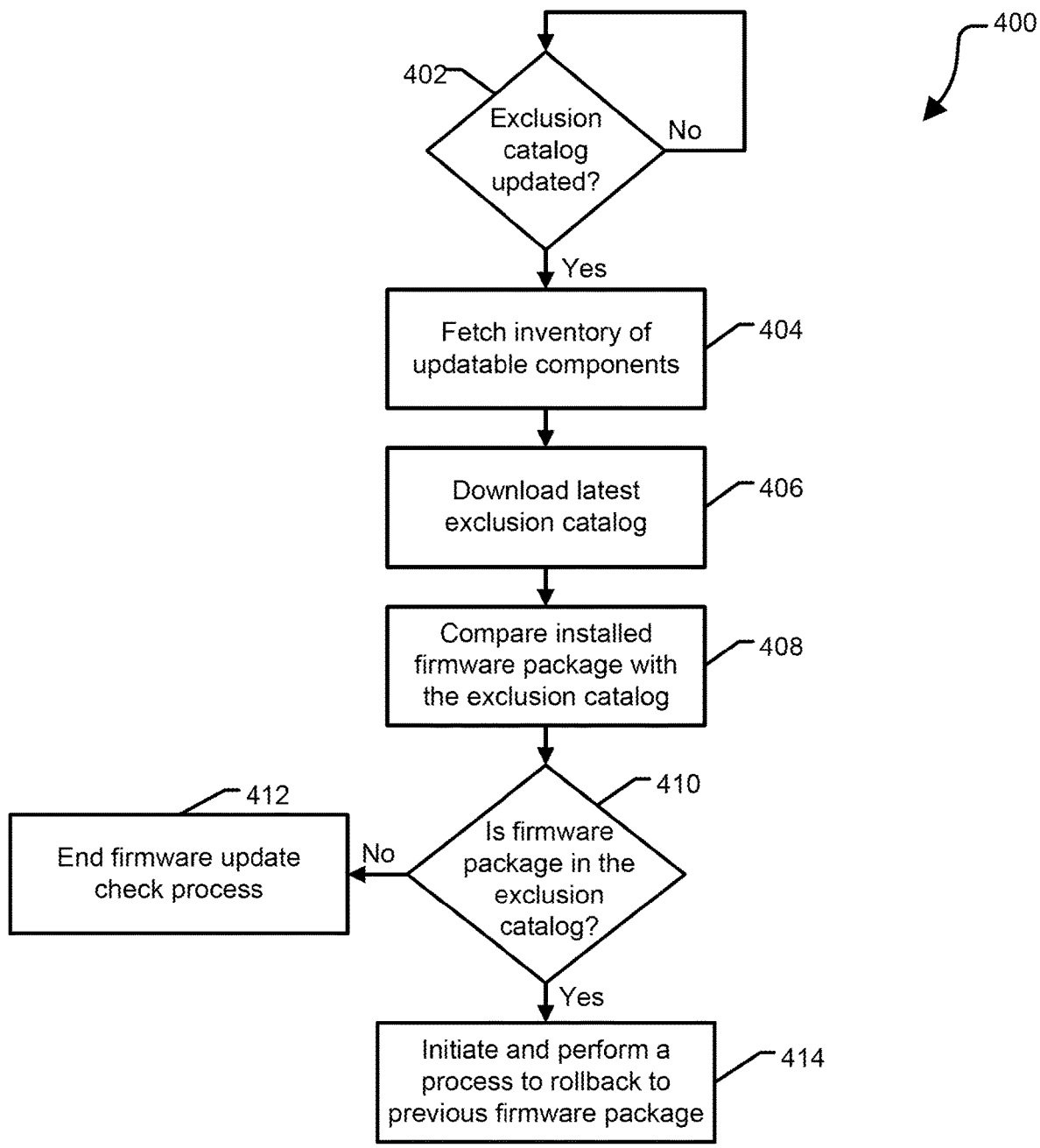
FIG. 4 is a flow diagram of a method for reverting to a previous firmware package according to at least one embodiment of the present disclosure.

FIG. 4 is a flow diagram of a method 400 for reverting to a previous firmware package according to at least one embodiment of the present disclosure. At block 402, a determination is made whether an exclusion catalog is updated. In an embodiment, a chassis management controller can make the determination by monitoring an exclusion catalog and determining whether the exclusion catalog has been refreshed. When the exclusion catalog is updated, an inventory of updatable components is fetched at block 404. In an embodiment, the chassis management controller can determine the inventory, such as installed firmware packages, of servers located within the chassis.

At block 406, a latest exclusion catalog is downloaded. Installed firmware package within a server is compared with the exclusion catalog at block 408. At block 410, a determination is made whether the installed firmware package is located within the exclusion catalog. In an embodiment, the determination can be made by comparing an installed version, identifier, firmware package hash, or the like with the details of demoted firmware updates within the exclusion catalog. If the installed firmware package is not within the exclusion catalog, a firmware update check process is ended at block 412. If the installed firmware package is within the exclusion catalog, a process to rollback to a previous firmware package is initiated and performed at block 414.

Figure 5:
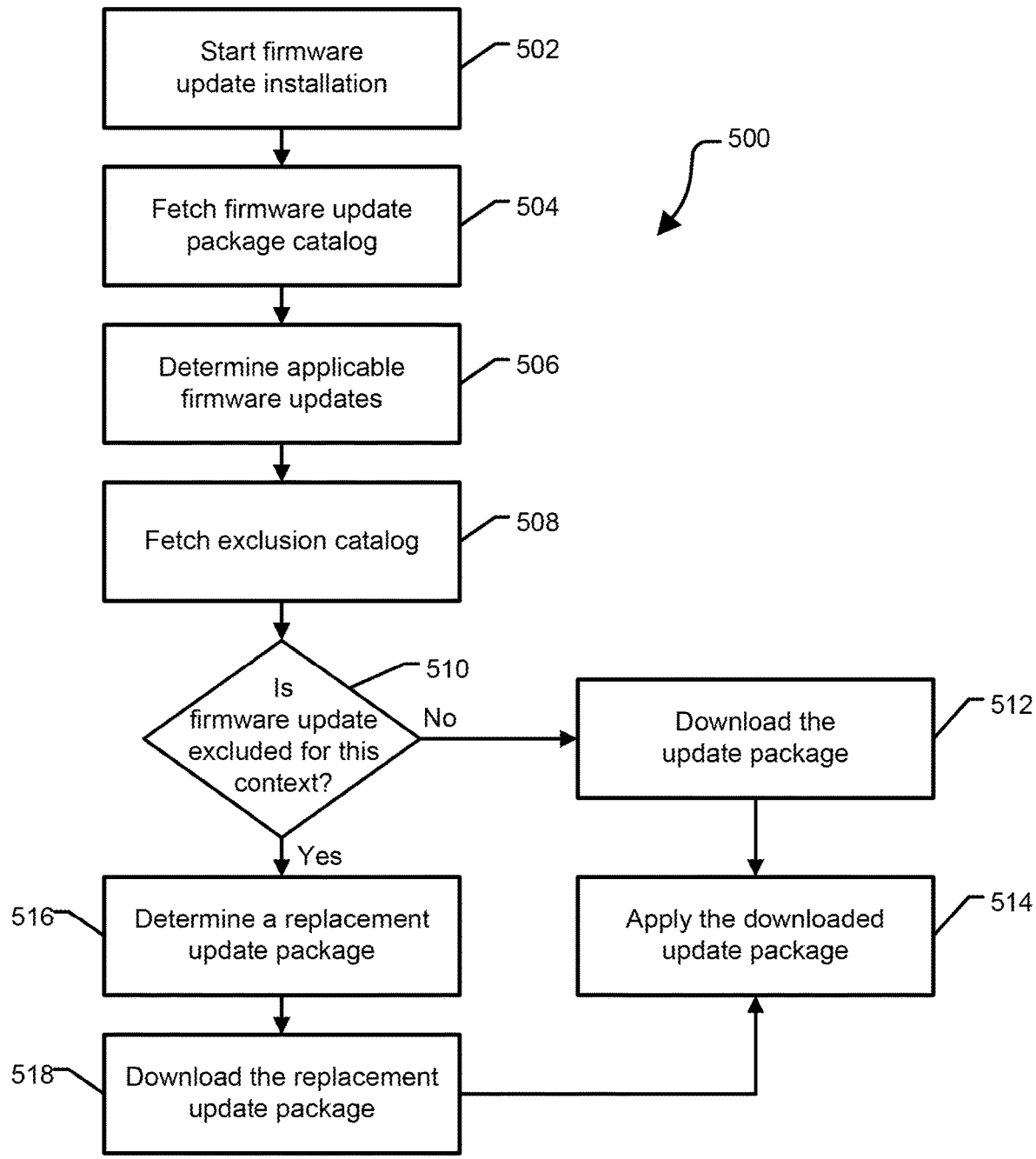
FIG. 5 is a flow diagram of a method for fetching a replacement firmware update while applying updates via catalog according to at least one embodiment of the present disclosure.

FIG. 5 is a flow diagram of a method 500 for fetching a replacement firmware update while applying updates via catalog according to at least one embodiment of the present disclosure. At block 502, a firmware update installation is started. A firmware update package catalog is fetched at block 504. At block 506, applicable firmware updates are determined. An exclusion catalog is fetched at block 508.

At block 510, a determination is made whether a firmware update is excluded for the context in which the firmware update is to be utilized. In an embodiment, the determination can be made by comparing a version, identifier, firmware package hash, or the like with the details of demoted firmware updates within the exclusion catalog. If the update package is not excluded, then the update package is downloaded at block 512. In an embodiment, a chassis management controller can download the firmware update to an update repository of a chassis. At block 514, the downloaded update package is applied. If the update package is excluded, a replacement update package is determined at block 516. At block 518, the replacement update package is downloaded, and the downloaded update package is applied at block 514.

Figure 6:
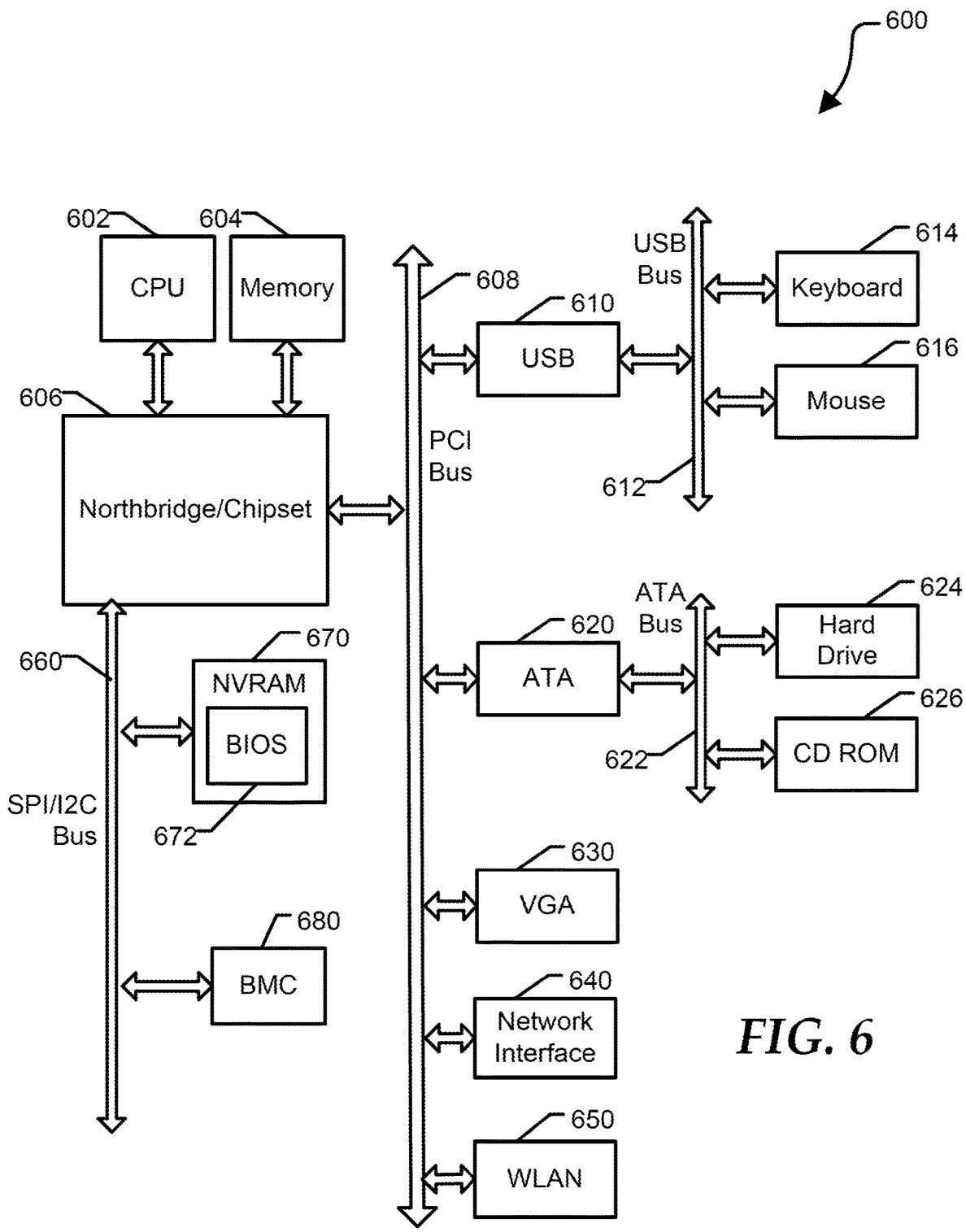
FIG. 6 is a block diagram of a general information handling system according to an embodiment of the present disclosure.

FIG. 6 illustrates a general information handling system 600, such as servers 112, 114, and 116, including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   determining that a first firmware update package is being demoted;
   extracting a first identifier for the first firmware update package;
   determining a first context in which the first firmware update package is being demoted;
   publishing the first firmware update package, and the first identifier and the first context for the first firmware update package in an exclusion catalog, wherein the exclusion catalog includes a plurality of demoted firmware update packages including the first firmware update package that are prevented from being installed on a server for the first context;
   identifying a context for the first firmware update package to be installed on the server;
   determining whether the context for the first firmware update package is the same as the first context within the exclusion catalog;
   in response to the first firmware update package being in the exclusion catalog and the context not being the first context for the first firmware update package within the exclusion catalog, installing the first firmware update package on the server for the context; and
   in response to the first firmware update package being in the exclusion catalog and the context being the first context for the first firmware update package within the exclusion catalog:
      preventing the first firmware update package from being applied within the server for the context; and
      sending an error message to a user of the server.

2. The method of claim 1, further comprising:
   determining a second firmware update package to replace the first firmware update package;
   extracting a second identifier for the second firmware update package;
   determining a second context in which the second firmware update package utilized; and
   publishing the second identifier and the second context for the second firmware update package a present catalog.

3. The method of claim 1, further comprising:
   reading, by a controller of the server, the present catalog;
   removing, by the controller, the first firmware update package for the first context from a package repository on the server based on the exclusion catalog;
   retrieving, by the controller, the second firmware update package based on the second firmware update package being located in the present catalog; and
   storing the second firmware update package in the package repository.

4. The method of claim 1, further comprising:
   reading the exclusion catalog;
   detecting that the first firmware update package was applied on the server for the first context prior to the exclusion catalog being published; and
   reverting back from the first firmware update package to a previous firmware update package based on the first firmware update package being located within the exclusion catalog for the first context.

5. The method of claim 1, wherein the first identifier is a globally unique identifier in an .xml file of the first firmware update package.

6. The method of claim 1, wherein the first context is selected from a group including: an operating system, a platform, and a context of a solution.

7. An information handling system comprising:
   product lifecycle management circuitry to receive an indication that a first firmware update package is to be demoted, to start a demotion process for the first firmware update package, and to remove the first firmware update package from being available on an Internet website;
   a management controller to communicate with the product lifecycle management circuitry, the management controller to extract a first identifier for the first firmware update package being demoted, to determine a first context in which the first firmware update package is being demoted, and publish the first firmware update package, the first identifier and the first context in an exclusion catalog, wherein the exclusion catalog includes a plurality of demoted firmware update packages including the first firmware update package that are prevented from being installed on a server for the first context; and
   a controller of the server to receive the exclusion catalog from the management controller, to identify a context for the first firmware update package to be installed on the server, to determine whether the context for the first firmware update package is the same as the first context within the exclusion catalog, in response to the first firmware update package being in the exclusion catalog and the context not being the first context for the first firmware update package within the exclusion catalog, to install the first firmware update package on the server for the context, and in response to the first firmware update package being in the exclusion catalog and the context being the first context for the first firmware update package within the exclusion catalog: to prevent the first firmware update package from being applied within the server for the context; and to send an error message to a user of the server.

8. The information handling system of claim 7, the management controller further to determine a second firmware update package to replace the first firmware update package, to extracting a second identifier for the second firmware update package, determine a second context in which the second firmware update package utilized, and publish the second identifier and the second context for the second firmware update package a present catalog.

9. The information handling system of claim 7, the controller of the server further to read the present catalog, to remove the first firmware update package for the first context from a package repository on the server based on the exclusion catalog, to retrieve the second firmware update package based on the second firmware update package being located in the present catalog, and to store the second firmware update package in the package repository.

10. The information handling system of claim 7, the controller of the server further to read the exclusion catalog, to detect that the first firmware update package was applied on the server for the first context prior to the exclusion catalog being published, and to revert back from the first firmware update package to a previous firmware update package based on the first firmware update package being located within the exclusion catalog for the first context.

11. The information handling system of claim 7, wherein the first identifier is a globally unique identifier in an .xml file of the first firmware update package.

12. The information handling system of claim 7, wherein the first context is selected from a group including: an operating system, a platform, and a context of a solution.

13. A method comprising:
receiving, by product lifecycle management circuitry, an indication that a first firmware update package is to be demoted;
starting a demotion process for the first firmware update package;
removing the first firmware update package from being available on an Internet website;
extracting, by a management controller, a first identifier for the first firmware update package;
determining a first context in which the first firmware update package is being demoted; and
publishing the first firmware update package, and the first identifier and the first context for the first firmware update package in an exclusion catalog, wherein the exclusion catalog includes a plurality of demoted firmware update packages including the first firmware update package that are prevented from being installed on a server for the first context;
identifying a context for the first firmware update package to be installed on the server;
determining whether the context for the first firmware update package is the same as the first context within the exclusion catalog;
in response to the first firmware update package being in the exclusion catalog and the context not being the first context for the first firmware update package within the exclusion catalog, installing the first firmware update package on the server for the context; and
in response the first firmware update package being in the exclusion catalog and to the context being the first context for the first firmware update package within the exclusion catalog:
preventing the first firmware update package from being applied within the server for the context; and
sending an error message to a user of the server.

14. The method of claim 13, further comprising:
determining a second firmware update package to replace the first firmware update package;
extracting a second identifier for the second firmware update package;
determining a second context in which the second firmware update package utilized; and
publishing the second identifier and the second context for the second firmware update package a present catalog.

15. The method of claim 13, further comprising:
reading, by a controller of the server, the present catalog;
removing, by the controller, the first firmware update package for the first context from a package repository on the server based on the exclusion catalog;
retrieving, by the controller, the second firmware update package based on the second firmware update package being located in the present catalog; and
storing the second firmware update package in the package repository.

16. The method of claim 13, further comprising:
reading the exclusion catalog;
detecting that the first firmware update package was applied on the server for the first context prior to the exclusion catalog being published; and
reverting back from the first firmware update package to a previous firmware update package based on the first firmware update package being located within the exclusion catalog for the first context.

17. The method of claim 13, wherein the first context is selected from a group including: an operating system, a platform, and a context of a solution.

* * * * *